(12) United States Patent
Agrawal

(10) Patent No.: US 10,027,614 B1
(45) Date of Patent: Jul. 17, 2018

(54) DUPLICATE NOTIFICATION MANAGEMENT

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/443,661

(22) Filed: Feb. 27, 2017

(51) Int. Cl.
*H04W 4/12* (2009.01)
*H04L 12/58* (2006.01)
*H04M 1/725* (2006.01)

(52) U.S. Cl.
CPC ............... *H04L 51/12* (2013.01); *H04L 51/38* (2013.01); *H04M 1/72519* (2013.01); *H04W 4/12* (2013.01)

(58) Field of Classification Search
CPC ......... H04W 4/06; H04W 24/02; H04W 4/16; H04W 4/20; H04L 5/0028; H04L 5/0032; H04L 12/1831; H04L 12/1895
See application file for complete search history.

(56) References Cited

U.S. PATENT DOCUMENTS

| 2010/0311320 | A1* | 12/2010 | Jung | H04H 20/86 455/3.01 |
| 2012/0079356 | A1* | 3/2012 | Choi | H04H 20/55 714/784 |
| 2015/0033099 | A1* | 1/2015 | Choi | H04H 20/55 714/776 |

* cited by examiner

*Primary Examiner* — Diane Mizrahi
(74) *Attorney, Agent, or Firm* — Kunzler, PC

(57) ABSTRACT

For managing multiple duplicative notifications, a method receives and parses, at a processor, a first notification. The method also receives and parses, at the processor, a second notification. The method also compares the second notification with the first notification to determine if the second notification has a substantially similar purpose as the first notification. The method also includes preventing, in response to the second notification having a substantially similar purpose, the second notification from being presented on a display.

20 Claims, 6 Drawing Sheets

US 10,027,614 B1

DUPLICATE NOTIFICATION MANAGEMENT

FIELD

The subject matter disclosed herein relates to user interaction with an electronic device.

BACKGROUND

Description of the Related Art

Electronic devices can provide notifications for various events in which a user is interested. However, the notifications lose their usefulness when the user receives a constant stream of redundant notifications. Devices that constantly flood the user with notifications with substantially the same information cause the user to waste time, by constantly looking at the device, and become cognitively draining to the user. It would be beneficial to provide an improved method of notification to users of electronic devices, and improved electronic devices configured to perform such methods could be developed.

BRIEF SUMMARY

An apparatus for duplicate notification management is disclosed. A method and program product also perform the below-described actions performed by the apparatus.

The apparatus includes, in one embodiment, a processor, a display to present notifications to a user and a memory that stores code executable by the processor to perform actions. In one embodiment, the actions include receiving and parsing a first notification, receiving and parsing a second notification, and comparing the second notification with the first notification to determine if the second notification has a substantially similar purpose as the first notification. In another embodiment, the actions also include preventing, in response to the second notification having a substantially similar purpose, the second notification from being presented on the display.

In another embodiment, the actions performed by the processor include displaying, in response to the second notification not having a substantially similar purpose, the second notification on the display. In addition, the actions may include maintaining a user preference indicative of a preferred notification method, where the preferred notification methods include email notifications, SMS notifications, application notification, operating system notifications, and digital assistant notifications.

In one embodiment, the actions performed by the processor also include determining if the first notification has been acknowledged by the user, and suppressing, in response to a determination that the first notification has been acknowledged by the user and that the second notification has a substantially similar purpose, the second notification. Alternatively, the actions performed by the processor may include displaying, in response to a determination that the first notification has not been acknowledged by the user and that the second notification has a substantially similar purpose, one of either the first notification or the second notification based on a user preference that defines a preferred notification method, and suppress any notification that does not utilize the preferred notification method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
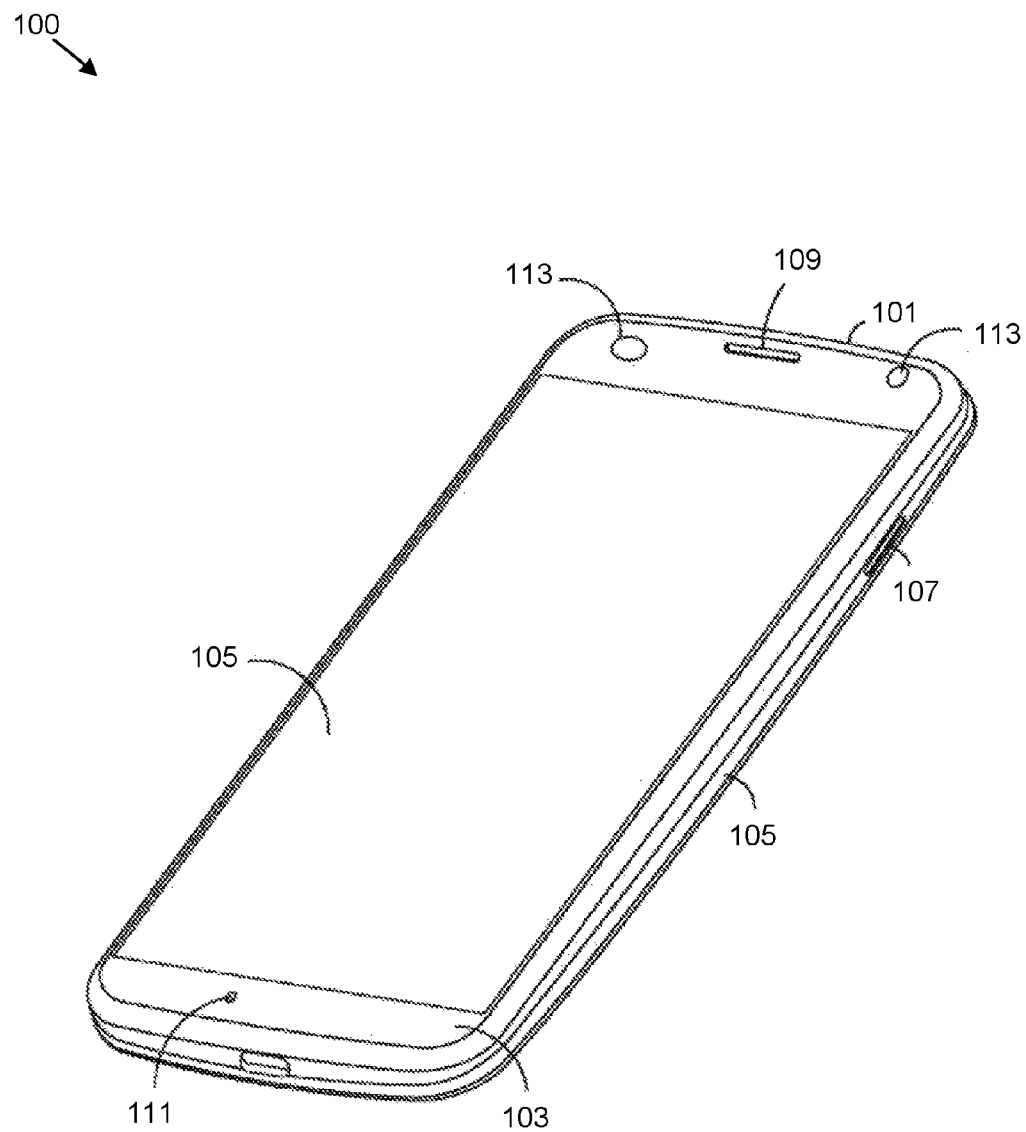
FIG. 1 is a perspective view of an example electronic device in accordance with embodiments of the present disclosure.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a perspective view of an example electronic device 100 in accordance with embodiments of the present disclosure. In the present embodiment, the electronic device 100 can be any type of device capable of providing touch screen interactive capabilities. Examples of the electronic device 100 include, but are not limited to, mobile devices, wireless devices, smart phones, tablet computing devices, personal digital assistants, personal navigation devices, touch screen input devices, touch or pen-based input devices, portable video or audio players, as well as any of a variety of other electronic devices. It is to be understood that the electronic device 100 may take the form of a variety of form factors, such as, but not limited to, bar, tablet, flip/clam/fold, slider and rotator form factors.

In the present example embodiment shown in FIG. 1, the electronic device 100 has a housing 101 comprising a front surface 103, which includes a touch screen display 105 that, together with certain other features discussed below, constitutes a user interface. In the present example, the touch screen display 105 is a touch screen including a touch-sensitive surface that overlays a display surface forming part of (or that is positioned just underneath or inwardly of) the front surface 103. In one embodiment, the touch screen display 105 (and particularly the display surface thereof) employs organic light-emitting diode (OLED) technology. Further, the user interface of the electronic device 100 as shown can also include one or more input keys 107. Examples of the input key or keys 107 include, but are not limited to, keys of an alpha or numeric (e.g., alphanumeric) keypad (or other keyboard), physical keys, touch-sensitive surfaces, mechanical surfaces, multipoint directional keys, and side buttons or keys. Further, as shown, the electronic device 100 can also comprise a speaker 109 and microphone 111 for audio output and input, respectively, along the front surface 103 (or other outer surfaces of the device).

In an alternate embodiment, the electronic device can include other features. For example, in place of the touch screen display, in an alternate embodiment, the electronic device can employ a touch-sensitive surface supported by the housing 101 that does not overlay (or is not overlaid) by any type of display. Indeed, although FIG. 1 shows one example display and user interface features, it is to be understood that the electronic device 100 can include a variety of other combinations of display and user interface features depending upon the embodiment.

Additionally, as shown in FIG. 1, the electronic device 100 includes one or more sensors 113, a number of which are shown to be positioned at or within an exterior boundary of the housing 101 (and can be supported on or within the housing 101). More particularly, as illustrated by FIG. 1, in the present embodiment the sensor or sensors 113 can be positioned at the front surface 103, another surface (such as one or more side surfaces 115) of the exterior boundary of the housing 101, or both. In the present embodiment, at least some of the sensors 113 (whether at the exterior boundary or within the exterior boundary, i.e., internal to the housing) are configured to detect one or more predetermined environmental conditions associated with an environment external or internal to the housing. Further examples of the sensors 113 are described below in reference to FIG. 2.

Figure 2:
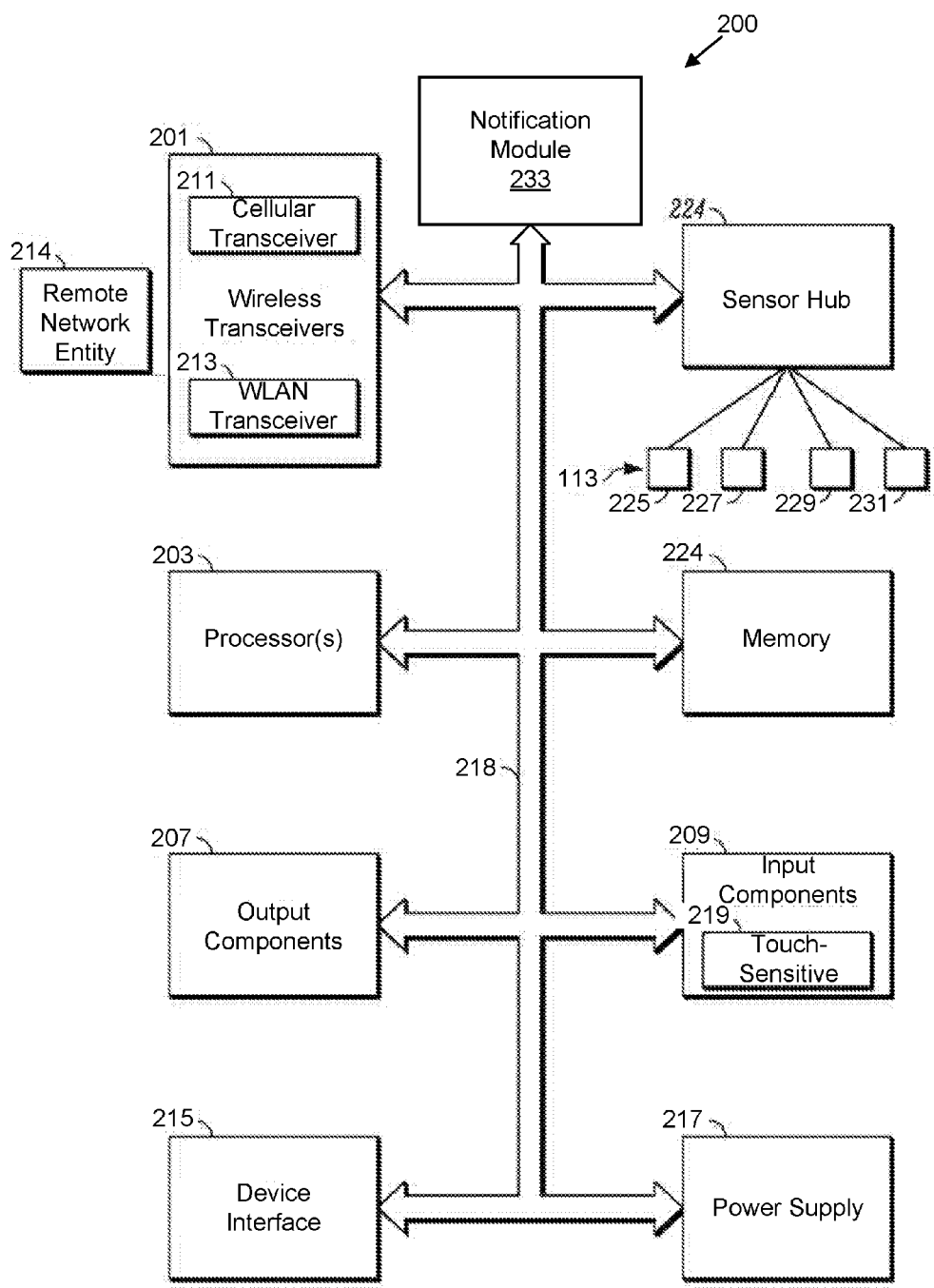
FIG. 2 is a schematic block diagram representing example components (e.g., internal components) of the electronic device in accordance with embodiments of the present disclosure.

FIG. 2 is a schematic block diagram representing example components (e.g., internal components) 200 of the electronic device 100 of FIG. 1, in accordance with embodiments of the present disclosure. In the depicted embodiment, the components 200 include one or more wireless transceivers 201, one or more processors 203, one or more memories 205, one or more output components 207, and one or more input components 209. As already noted above, the electronic device 100 includes a user interface, including the touch screen display 105 that comprises one or more of the output components 207 and one or more of the input components 209. Additionally, the electronic device 100 includes a plurality of the sensors 113, several of which are described in more detail below. In one embodiment, the sensors 113 are in communication with (to provide sensor signals to or receive control signals from) a sensor hub 224.

In one embodiment, the components 200 include a device interface 215 to provide a direct connection to auxiliary components or accessories for additional or enhanced functionality. In addition, the internal components 200 include a power source or supply 217, such as a portable battery, for providing power to the other internal components and allow portability of the electronic device 100. As shown, all of the components 200, and particularly the wireless transceivers 201, processors 203, memories 205, output components 207, input components 209, sensor hub 224, device interface 215, and power supply 217, are coupled directly or indirectly with one another by way of one or more internal communication link(s) 218 (e.g., an internal communications bus).

In a further embodiment, the wireless transceivers 201 include a cellular transceiver 211 and a Wi-Fi transceiver 213. In alternative embodiments, the wireless transceivers are intended to encompass numerous embodiments in which any arbitrary number of (e.g., more than two) wireless transceivers employing any arbitrary number of (e.g., two or more) communication technologies are present. More particularly, in the present embodiment, the cellular transceiver 211 is configured to conduct cellular communications, such as 3G, 4G, 4G-LTE, vis-à-vis cell towers (not shown), albeit in other embodiments, the cellular transceiver 211 can be configured to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 213 may be a wireless local area network (WLAN) transceiver configured to conduct Wi-Fi communications in accordance with the IEEE 802.11(a, b, g, or n, etc.) standard with access points. In other embodiments, the Wi-Fi transceiver 213 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 213 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Although in the present embodiment each of the wireless transceivers 201 serves as or includes both a respective transmitter and a respective receiver, it should be appreciated that the wireless transceivers are also intended to encompass one or more receiver(s) that are distinct from any transmitter(s), as well as one or more transmitter(s) that are distinct from any receiver(s). In one example embodiment encompassed herein, the wireless transceiver 201 includes at least one receiver that is a baseband receiver.

Exemplary operation of the wireless transceivers 201 in conjunction with others of the components 200 of the electronic device 100 can take a variety of forms and can include, for example, operation in which, upon reception of wireless signals (as provided, for example, by remote device(s)), the internal components detect communication signals and the transceivers 201 demodulate the communication signals to recover incoming information, such as voice or data, transmitted by the wireless signals. After receiving the incoming information from the transceivers 201, the processors 203 format the incoming information for the one or more output components 207.

Likewise, for transmission of wireless signals, the processors 203 format outgoing information, which can but need not be activated by the input components 209, and conveys the outgoing information to one or more of the wireless transceivers 201 for modulation to provide modulated communication signals to be transmitted. The wireless transceiver(s) 201 convey the modulated communication signals by way of wireless (as well as possibly wired) communication links to other devices (e.g., remote devices). The wireless transceivers 201 in one example allow the electronic device 100 to exchange messages with remote devices, for example, a remote network entity 214 of a cellular network or WLAN network. Examples of the remote network entity 214 include an application server, web server, database server, content server, SMS server, or other network entity accessible through the wireless transceivers 201 either directly or indirectly via one or more intermediate devices or networks (e.g., via a WLAN access point, the Internet, LTE network, or other network).

Depending upon the embodiment, the output and input components 207, 209 of the components 200 can include a variety of visual, audio, or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm, or buzzer, or one or more mechanical output devices such as a vibrating mechanism or motion-based mechanism. Likewise, by example, the input device(s) 209 can include one or more visual input devices such as an optical sensor (for example, a camera lens and photosensor), one or more audio input devices such as a microphone, and one or more mechanical input devices such as a flip sensor, keyboard, keypad, selection button, navigation cluster, touch pad, capacitive sensor, motion sensor, and switch.

As noted, the user interface and particularly the touch screen display 105 of the electronic device 100 of FIG. 1 can be considered to constitute or include both one or more of the input components 209, particularly a touch-sensitive input component 219 shown in FIG. 2, and one or more of the output components 207. Further, it should be appreciated that the operations that can actuate one or more of the input devices 209 can include not only the physical pressing/activating of the touch screen display 105 or buttons or other actuators of the user interface or otherwise, but can also include, for example, opening the electronic device 100 (if it can take on open or closed positions), unlocking the electronic device 100, moving the electronic device to actuate a motion, moving the electronic device to actuate a location positioning system, and operating the electronic device.

In one embodiment, one or more of the input components 209, such as one or more input components encompassed by the user interface such as the touch-sensitive component 219 shown in FIG. 1, can produce an input signal in response to detecting a predetermined gesture. In this regard, the touch-sensitive component 219 can be considered a gesture sensor and can be or include, for example, a touch-sensitive sensor having a touch-sensitive surface substantially parallel to the display. The touch-sensitive sensor can include at least one of a capacitive touch sensor, a resistive touch sensor, an acoustic sensor, an ultrasonic sensor, a proximity sensor, or an optical sensor.

In one embodiment, the components 200 also can include one or more of various types of the sensors 113. Although the sensors 113 are, for the purposes of FIG. 2, shown to be distinct from the input devices 209, the sensors can also be considered as being encompassed among the input devices 209. In alternate embodiments, one or more of the input devices can be encompassed among the sensors, one or more of the sensors can be considered distinct from the input devices, one or more of the input devices can be considered distinct from the sensors, or all of the sensors can be considered distinct from all of the input devices and vice-versa.

With respect to the sensors 113 particularly shown in FIG. 2, these particularly include various sensors 225 through 231 that are examples of sensors that can be included or utilized by the electronic device 100. As already noted, as shown in FIG. 2, the various sensors 225-231 in the present embodiment can be controlled by the sensor hub 224, which can operate in response to or independent of the processor(s) 203. The various sensors 225 through 231 can include, but are not limited to, one or more power sensors 225, one or more temperature sensors 227, one or more pressure sensors 228, one or more moisture sensors 229, and one or more ambient noise sensors 231.

Although the various sensors 225 through 231 are shown in FIG. 2, in other embodiments one or more of numerous other types of sensors can also be included among the sensors 113 including, for example, one or more motion sensors, including for example one or more accelerometers or Gyro sensors (not shown), one or more light sensors, one or more proximity sensors (e.g., a light detecting sensor, an ultrasound transceiver or an infrared transceiver), one or more other touch sensors, one or more altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the electronic device 100.

With respect to the processor(s) 203, the processor(s) can include any one or more processing or control devices such as, for example, a microprocessor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the electronic device 100, such as interaction among the various components included among the components 200, communication with external devices or networks via the wireless transceivers 201 or the device interface 215, and storage and retrieval of applications, modules, and data, to and from the memories 205. Each application (or module) includes executable code that utilizes an operating system to provide more specific functionality, such as file system service and handling of protected and unprotected data stored in the memories 205. Such operating system or application information can include software update information (which can be understood to potentially encompass updates to either application(s) or operating system(s) or both). As for informational data, this is typically non-executable code or information that can be referenced or manipulated by an operating system or application for performing functions of the electronic device 100.

In one embodiment, the components 200 of the electronic device 100 include a notification module 233. The notification module 233, briefly, is configured to identify duplicate or redundant notifications and suppress those notifications that do not include new information. A detailed explanation of the notification module 233 will be given below with reference to FIG. 4. The notification module 233 may be a separate hardware circuit, or in an alternative embodiment, an application functioning within the operating system that is executable from the memory 224.

It is to be understood that FIG. 2 is provided for illustrative purposes only and for illustrating components of an electronic device 100 in accordance with various embodiments of the present disclosure, and is not intended to be a complete schematic diagram of the various components required for an electronic device. Therefore, an electronic device can include various other components not shown in FIG. 2, or can include a combination of two or more components or a division of a particular component into two or more separate components, and still be within the scope of the disclosed embodiments.

Figure 3:
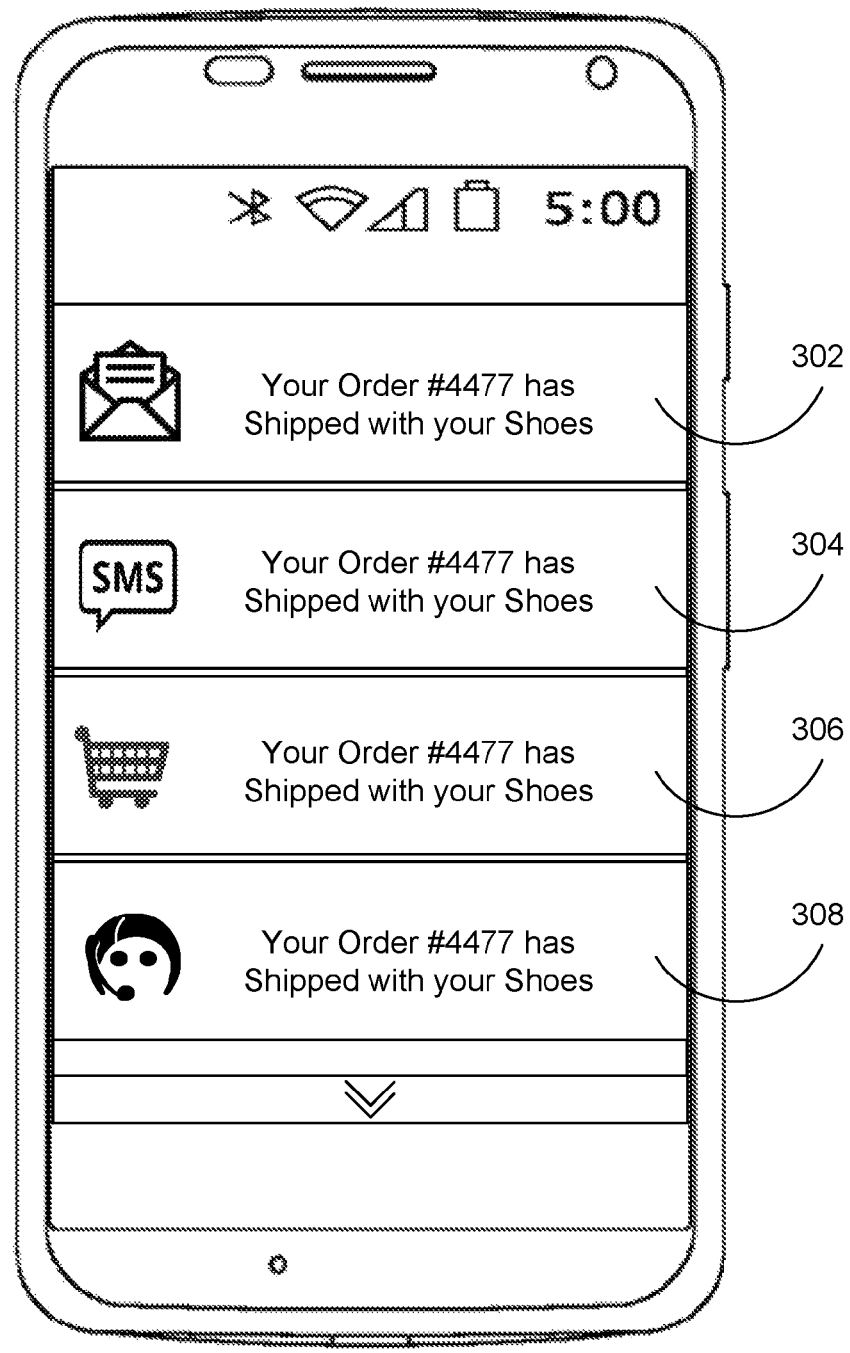
FIG. 3 is a block diagram illustrating one embodiment of a notification-displaying device in accordance with embodiments of the present disclosure.

FIG. 3 is a block diagram illustrating one embodiment of a notification-displaying device in accordance with embodiments of the present disclosure. In one embodiment, the notification-displaying device is the electronic device 100 described above with reference to FIGS. 1 and 2. The electronic device 100 is capable of displaying notifications from various data feeds. As used herein, the phrase "data feed" refers to a stream of data received from a source. Examples of sources may include, but are not limited to, email 302, text (i.e., SMS) 304, applications 306, digital personal assistants 308, calendars, etc. The source may also be an operating system.

In the depicted embodiment, the data-feed sources may each cause a notification to be displayed to a user by the electronic device 100. These notifications may each contain the same or substantially similar information. For example, in the depicted embodiment, the user has ordered an item from a seller and is receiving a notification from the seller that the item has shipped. In some embodiments, the user may receive this information by email 302 and text 304. If the user has an application installed that is specific to that seller (e.g., the Amazon® app), the user may also receive a notification 306 from the application. A personal digital assistant may also track the shipment, based on a parsing of the email, and provide another notification 308 of the shipment. Potentially, the user may be notified four or more times for each of placing an order, having the order ship, receiving the order, etc. The total number of notifications for this single order may quickly exceed 20 notifications.

Beneficially, the notification module 233 (as will be described in greater detail below) is configured to identify duplicate notifications and suppress or mute the duplicates. In some embodiments, the notification module 233 is configured to recognize when a first notification is received and mute subsequent notifications. In an alternative embodiment, the notification module 233 is configured to identify when notifications have not been read, and only display a preferred notification of all of the notifications.

Figure 4:
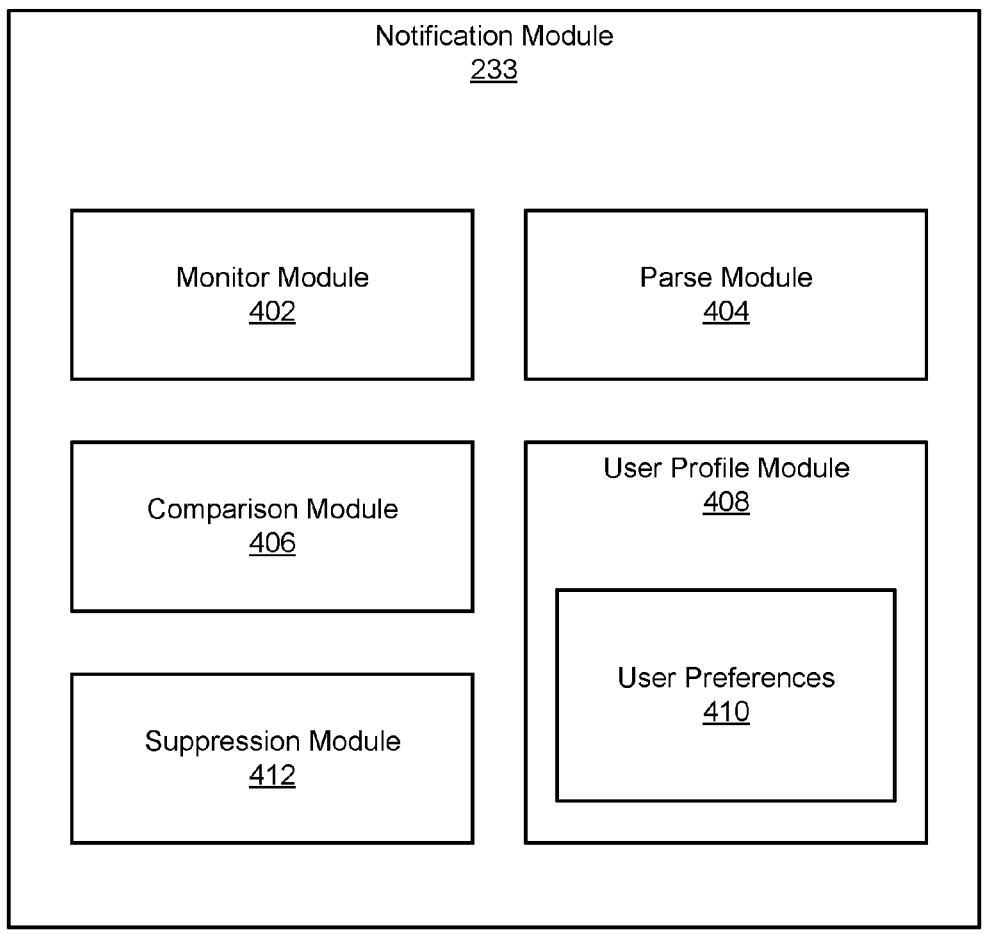
FIG. 4 is a schematic block diagram illustrating one embodiment of the notification module in accordance with embodiments of the present disclosure.

FIG. 4 is a schematic block diagram illustrating one embodiment of the notification module 233 in accordance with embodiments of the present disclosure. In one embodiment, the notification module 233 includes a monitor module 402, a parse module 404, a comparison module 406, a user profile module 408 with user preferences 410, and a suppression module 412.

The monitor module 402, in one embodiment, is configured to monitor notifications that are received and/or presented to the user (i.e., aural, visual, or tactile notifications). As used herein, a "notification" is any message that is presented to a user outside of an application's normal user interface. As known to those of skill in the art, any application can issue a notification to be displayed in the notification area (e.g., notification drawer). The notification area is typically a system-controlled (e.g., operating system) area that the user can view at any time. The monitor module 402 may be configured to interact with the operating system to intercept notifications before the notifications are presented to the user. In one embodiment, the monitor module 402 functions as a notification listener configured to read all notifications presented by the operating system or any installed app.

In a further embodiment, the monitor module 402 is configured to identify applications operating within the operating system that are capable of presenting notifications, and, communicating with those applications. For example, the monitor module 402 may be configurable and updateable with APIs of the identified applications to determine what kinds of notifications the identified applications will be presenting to the user. The monitor module 402 may be configured to communicate with the identified applications to determine user preferences (e.g., if a user prefers SMS to email notifications).

The parse module 404, in one embodiment, communicates with the monitor module 402 to receive the notifications and subsequently analyze and separate the notifications into separate pieces. The parse module 404 analyzes each notification to extract keywords and phrases that can be categorized into groups or classifications for comparison. The parse module 404, in one example, may parse a notification to determine the source of the notification and object of the notification. The source of the notification may be, for example, an online retailer that is sending a notification of an order placed by the user. The object of the notification might be a package that is being delivered as part of the order. It is contemplated that many other use scenarios may be implemented based on the methods and systems of the present disclosure, including but not limited to, calendar events, banking events, etc. Other examples of objects of notifications include, but are not limited to, (1) calendar event notifications that are presented by both a calendar app and an email reminder, (2) financial transaction notifications that are received via email, SMS, and from financial apps, and (3) similar situations related to booking movies, refilling gas, etc.

The comparison module 406, in one embodiment is configured to compare the parsed information of the each notification with other recent notifications. In one embodiment, the comparison module 406 is configured with a predetermined and/or user-defined time window within which notifications are compared. Outside of this window, the comparison module 406 may consider a notification as a "new" notification even if it contains duplicative information. For example, this time period may be 24 hours. Within the time period, the comparison module 406 utilizes the extracted information from the parse module 404 to determine if a notification contains duplicate information and is redundant. In one example, the comparison module compares the object (and any corresponding details related to the object) with the objects of other notifications. As will be understood, the details of an object may change and thus warrant the issuing of a new notification to the user (i.e., tracking information is updated). The comparison module 406 is configured to identify that the details have changed and allow, via the suppression module 412, the notification to be presented to the user as a new notification.

If, in the alternative, the comparison module 406 has determined that the object and the details of the notification are duplicative of another notification, the comparison module 406 marks the notification as a duplicate, and via the suppression module 412, suppresses or mutes the notification.

In another embodiment, the comparison module 406 is configured to group together related notifications so that only one of the related notifications is presented to a user. In this example, and as will be explained below, a preferred notification method may be used to select one of the related notifications to be presented to the user. For example, if email is preferred, the comparison module will group the notifications, present the email notification, and via the suppression module 412, mute or suppress the other related notifications. As can be appreciated, many different methods may be implemented to compare, rank, and group notifications. For example, notifications may be tagged with a unique identifier based on the source and the object of the notification (e.g., hash of object, first three letters of object, etc.). When two or more notifications are tagged with the same or substantially similar identifier, those notifications are grouped as related notifications.

The user profile module 408 is configured to maintain user preferences 410 related to the presentation of notifications in accordance with embodiments of the present disclosure. User preferences 410, in one embodiment, may include, but are not limited to, a preferred and/or prioritized notification method (e.g., email is preferred over text, etc.). For example, a user may identify a prioritization of notifications methods such as email is preferred over text messages, which are preferred over application notifications, which are preferred over digital assistant notifications. User preferences 410 may also include time frames within which notifications are allowed, and/or time frames where one notification method/source is preferred over another.

The suppression module 412, in one embodiment, is configured to silence or mute the notifications that have been flagged or marked as duplicates of previous notifications. In one embodiment, muting or suppressing a notification includes removing the notification from the notification area and/or stopping any visual (e.g., blinking LED), aural (e.g., beep), or tactile (e.g., vibrating) notification. In another embodiment, the suppression module 412 mutes or suppresses all duplicate notifications except for the notification from the preferred notification method (e.g., email).

Figure 5:
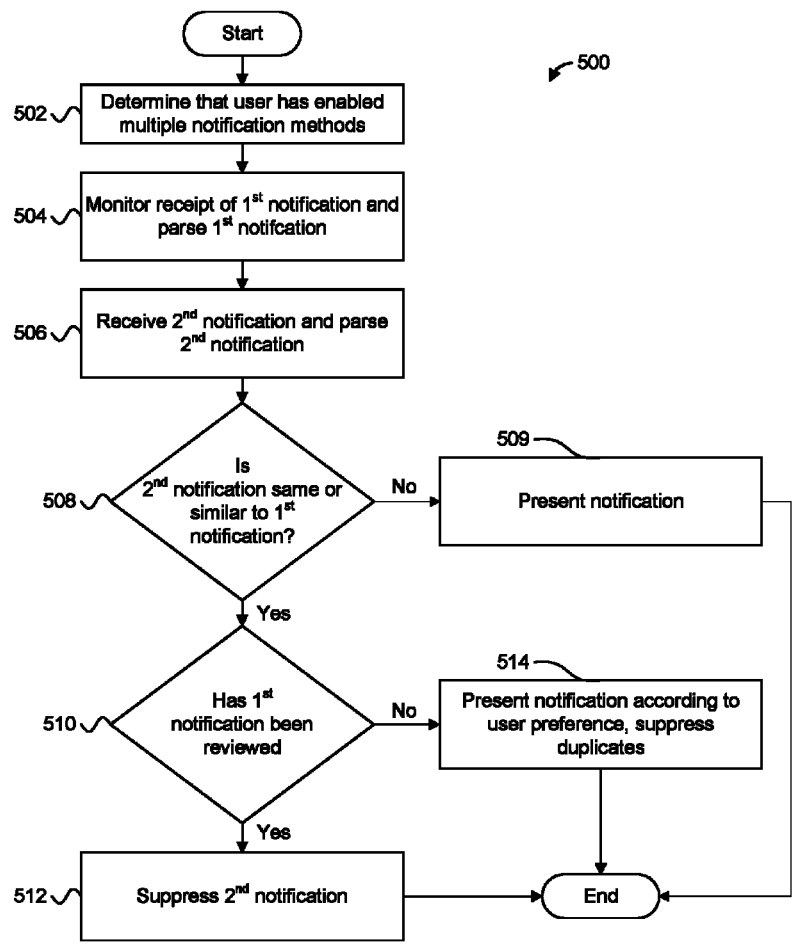
FIG. 5 is a schematic flow chart diagram illustrating one embodiment of a method for duplicate notification management in accordance with embodiments of the present disclosure.

FIG. 5 is a schematic flow chart diagram illustrating one embodiment of a method 500 for duplicate notification management in accordance with embodiments of the present disclosure. The method 500 is performed by processing logic that may comprise hardware (circuitry, dedicated logic, etc.), software (such as is run on a general-purpose computing system or a dedicated machine), or a combination of both. In one embodiment, the notification module 233 performs the method 500. Alternatively, other components of electronic device 100 perform some or all of the method 500.

In one embodiment, the processing logic begins the method 500 by determining, at block 502, that the user has enabled multiple notification methods. In one embodiment, multiple notification methods refer to receiving a notification from one or more sources including, but not limited to, email, SMS, digital assistant, and application. In one embodiment, the processing logic determines that multiple notifications is enabled by receiving input from a user regarding the multiple methods. Furthermore, the processing logic may receive from the user a preferred notification method. For example, the processing logic may receive a preference from the user that the user prefers to review the email version of a notification, which contains more information than the SMS version of the notification. In yet another embodiment, the processing logic may determine, at block 502, that the user is receiving notifications about the same subject/object/purpose by analyzing the received notifications and detecting similarities.

At block 504, the processing logic monitors receipt of a first notification and parses the notification. Although the below described method discusses first and second notifications, it is to be understood that the method applies equally to third, fourth, and all potentially duplicate notifications. The processing logic parses the first notification to extract the purpose (i.e., object) of the notification, whether that be an online purchase, a calendar event, etc. The processing logic may also categorize the notification for future grouping of notifications.

At block 506, the processing logic receives a second notification and parses the second notification. At decision block 508, the processing logic determines if the second notification is the same as, or very similar to, the first notification. If the second notification is not similar, then the processing logic, at block 509, presents the notification to the user and the method 500 ends.

However, if the second notification is determined to be similar, at decision block 508, then the processing logic determines, at decision block 510, if the first notification has already been viewed by the user. If yes, the processing logic suppresses, at block 512, the second notification and the method 500 ends. If however, the processing logic determines that the first notification has not been viewed (because the user has not acknowledged, clicked, swiped, or otherwise dismissed the notification), the processing logic, at block 514, analyzes the duplicate notifications and determines which notification to present to the user. In one embodiment, the processing logic refers to the user preference to determine which notification method to use. The user preference may be a user-defined rule, for example, "present email notification when available." In an alternative embodiment, the processing logic determines which notification method a user prefers by analyzing usage patterns. For example, when a user is presented with duplicate notifications from multiple sources, the processing logic may identify a notification method that the user primarily picks (e.g., over time, the user selects the email notification more often than the app or SMS notification). After the processing logic determines which notification method to use, and suppresses the others, the processing logic presents the notification using the identified notification method, and the method 500 ends. In a further embodiment, the processing logic may determine that certain notifications contain information that others notifications do not, and prepare a superset notification that contains all of the information from across the substantially similar notifications. For example, an email may contain an address to an event that a text message does not, while the text message has a phone number that the email does not. Accordingly, the processing logic may combine the information in to a superset notification.

Figure 6:
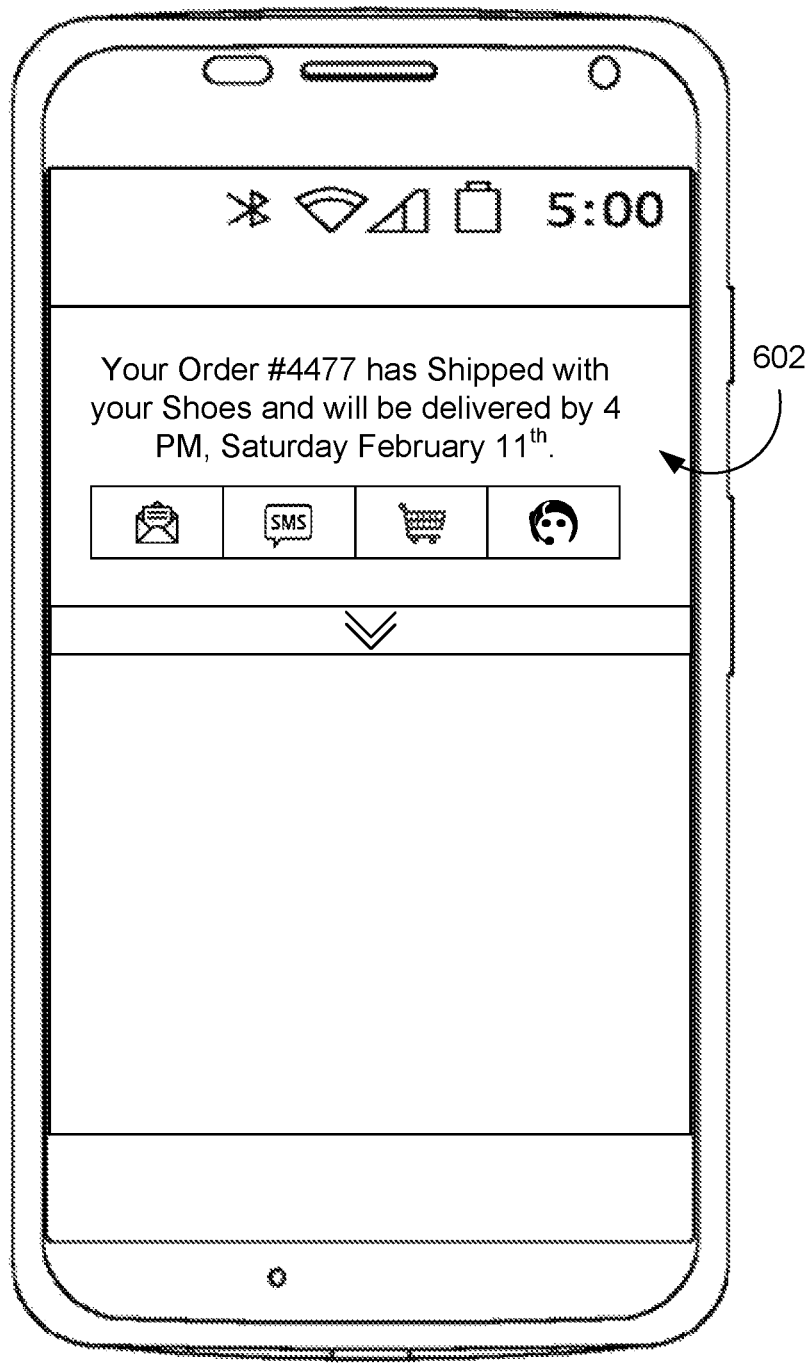
FIG. 6 is a schematic block diagram illustrating one embodiment of a consolidated notification in accordance with embodiments of the present disclosure.

FIG. 6 is a schematic block diagram illustrating one embodiment of a consolidated notification in accordance with embodiments of the present disclosure. As described above with reference to FIGS. 2-5, the notification module 233 may be configured to present a consolidated notification 602 (i.e., a superset notification) that contains a superset of all of the information from the different notification sources. As used herein, the term "superset" refers to a grouping of all of the information identified in each of the related notifications, without including duplicate information. Stated differently, if each notification source contains the same event time (e.g., 11:30 AM), the event time is only included once in the consolidated or superset notification 602.

In one example, if a SMS notification includes a time and a name of a location, but not an address, and the email notification contains the address, then the consolidated notification 602 will contain the time, the name of the location, and the address. Additionally, the notification module 233 may be configured to indicate from which sources the consolidated notification 602 was generated. In the depicted embodiment, four distinct notification sources are identified (e.g., email, SMS, application, and virtual assistant). However, any number of notification sources may be identified by the consolidated notification 602.

Embodiments may be practiced in other specific forms. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus comprising:
   a processor;
   a display to present notifications to a user; and
   a memory that stores code executable by the processor to:
      receive and parse a first notification;
      receive and parse a second notification;
      compare the second notification with the first notification to determine that the second notification has a substantially similar object as the first notification; and
      prevent, in response to the second notification having a substantially similar object, the second notification from being presented on the display.

2. The apparatus of claim 1, where the code is further executable by the processor to display, in response to the second notification not having a substantially similar object, the second notification on the display.

3. The apparatus of claim 1, where the code is further executable by the processor to maintain a user preference indicative of a preferred notification method.

4. The apparatus of claim 3, where the preferred notification method is selected from the group consisting of an email notification, an SMS notification, an application notification, an operating system notification, and a digital assistant notification.

5. The apparatus of claim 1, where the code is further executable by the processor to determine if the first notification has been acknowledged by the user.

6. The apparatus of claim 5, where the code is further executable by the processor to, in response to a determination that the first notification has been acknowledged by the user and that the second notification has a substantially similar object, suppress the second notification.

7. The apparatus of claim 5, where the code is further executable by the processor to, in response to a determination that the first notification has not been acknowledged by the user and that the second notification has a substantially similar object, display one of either the first notification or the second notification based on a user preference that defines a preferred notification method, and suppress any notification that does not utilize the preferred notification method.

8. A method comprising:
   receiving and parsing, at a processor, a first notification;
   receiving and parsing, at the processor, a second notification;
   comparing the second notification with the first notification to determine if the second notification has a substantially similar object as the first notification; and
   preventing, in response to the second notification having a substantially similar object, the second notification from being presented on a display.

9. The method of claim 8, further comprising displaying, in response to the second notification not having a substantially similar object, the second notification on the display.

10. The method of claim 8, further comprising maintaining a user preference indicative of a preferred notification method.

11. The apparatus of claim 10, where the preferred notification method is selected from the group consisting of an email notification, an SMS notification, an application notification, an operating system notification, and a digital assistant notification.

12. The method of claim 8, further comprising determining if the first notification has been acknowledged by the user.

13. The method of claim 12, further comprising suppressing, in response to a determination that the first notification has been acknowledged by the user and that the second notification has a substantially similar object, the second notification.

14. The method of claim 12, further comprising displaying, in response to a determination that the first notification has not been acknowledged by the user and that the second notification has a substantially similar object, one of either the first notification or the second notification based on a user preference that defines a preferred notification method, and suppressing any notification that does not utilize the preferred notification method.

15. A computer storage device storing that stores computer-executable instructions that, when executed by a processor of a computing device that includes a memory, cause the computing device perform actions comprising:
   receiving and parsing, at the processor, a first notification;
   receiving and parsing, at the processor, a second notification;
   comparing the second notification with the first notification to determine if the second notification has a substantially similar object as the first notification; and
   preventing, in response to the second notification having a substantially similar object, the second notification from being presented on a display.

16. The computer storage device of claim 15, where the actions further comprise displaying, in response to the second notification not having a substantially similar object, the second notification on the display.

17. The computer storage device of claim 15, where the actions further comprise maintaining a user preference indicative of a preferred notification method.

18. The computer storage device of claim 17, where the preferred notification method is selected from the group consisting of an email notification, an SMS notification, an application notification, an operating system notification, and a digital assistant notification.

19. The computer storage device of claim 15, where the actions further comprise determining if the first notification has been acknowledged by the user.

20. The computer storage device of claim 19, where the actions further comprise displaying, in response to a determination that the first notification has not been acknowledged by the user and that the second notification has a substantially similar object, one of either the first notification or the second notification based on a user preference that defines a preferred notification method, and suppressing any notification that does not utilize the preferred notification method.

* * * * *